(12) United States Patent
Gerard et al.

(10) Patent No.: US 10,196,914 B2
(45) Date of Patent: Feb. 5, 2019

(54) TURBINE EXHAUST HOUSING

(71) Applicant: Garrett Transportation I Inc., Torrance, CA (US)

(72) Inventors: Arnaud Gerard, Epinal (FR); Aurelien Tingaud, Epinal (FR); Shankar Pandurangasa Solanki, Bangalore (IN); Mohan Javvadi, Bangalore (IN)

(73) Assignee: Garrett Transportation I Inc., Torrance, CA (US)

( * ) Notice: Subject to any disclaimer, the term of this patent is extended or adjusted under 35 U.S.C. 154(b) by 371 days.

(21) Appl. No.: 15/168,157

(22) Filed: May 30, 2016

(65) Prior Publication Data

US 2016/0348524 A1 Dec. 1, 2016

Related U.S. Application Data

(63) Continuation of application No. 13/775,951, filed on Feb. 25, 2013, now Pat. No. 9,353,637, which is a continuation-in-part of application No. 13/469,268, filed on May 11, 2012, now Pat. No. 9,011,089.

(51) Int. Cl.
| | |
|---|---|
| *F01D 11/00* | (2006.01) |
| *F04D 25/04* | (2006.01) |
| *F01D 17/16* | (2006.01) |
| *F01D 25/24* | (2006.01) |
| *F02C 6/12* | (2006.01) |
| *F02C 7/28* | (2006.01) |
| *F16J 15/08* | (2006.01) |
| *F02B 33/40* | (2006.01) |
| *F02B 37/24* | (2006.01) |

(52) U.S. Cl.
CPC ............ *F01D 11/005* (2013.01); *F01D 11/00* (2013.01); *F01D 11/003* (2013.01); *F01D 17/165* (2013.01); *F01D 25/24* (2013.01); *F02B 33/40* (2013.01); *F02B 37/24* (2013.01); *F02C 6/12* (2013.01); *F02C 7/28* (2013.01); *F04D 25/04* (2013.01); *F04D 25/045* (2013.01); *F16J 15/0887* (2013.01); *F05D 2220/40* (2013.01); *F05D 2240/55* (2013.01); *Y10T 29/49323* (2015.01)

(58) Field of Classification Search
CPC .. F01D 11/005; F01D 17/165; F05D 2240/55; F16J 15/028; F16J 15/062; F16J 15/0887
See application file for complete search history.

(56) References Cited

U.S. PATENT DOCUMENTS

| | | | | |
|---|---|---|---|---|
| 8,568,092 B2* | 10/2013 | Matsuyama | .......... | F01D 11/005 415/173.3 |
| 2009/0092483 A1* | 4/2009 | Yasui | .................... | F01D 17/165 415/159 |
| 2011/0206500 A1* | 8/2011 | Nagao | .................... | F01D 5/141 415/148 |
| 2012/0263585 A1* | 10/2012 | Matsuyama | .......... | F16J 15/0887 415/204 |

* cited by examiner

*Primary Examiner* — Ninh H. Nguyen
(74) *Attorney, Agent, or Firm* — Brian J. Pangrle

(57) ABSTRACT

A turbine assembly can include a turbine wheel, a shroud component, a turbine housing and a seal that includes a wall and a lower lip that that extends radially outwardly from the wall where the seal is disposed, at least in part, between an outer surface of the shroud component and an inner surface of the turbine housing and where the lower lip is in contact with the turbine housing.

13 Claims, 11 Drawing Sheets

TURBINE EXHAUST HOUSING

RELATED APPLICATION

This application is a continuation of U.S. patent application Ser. No. 13/775,951, filed 25 Feb. 2013, which is a continuation-in-part of U.S. patent application Ser. No. 13/469,268, filed 11 May 2012, which is incorporated by reference herein.

TECHNICAL FIELD

Subject matter disclosed herein relates generally to exhaust turbines for internal combustion engines.

BACKGROUND

An exhaust system of an internal combustion engine can include a turbine wheel set in a turbine housing to create backpressure. In such a system, as the pressurized exhaust passes through the turbine housing (e.g., en route to an atmospheric outlet), the turbine wheel harnesses energy as the exhaust expands.

Various parameters may characterize a turbine wheel or a turbine housing. For example, a parameter known as "A/R" (e.g., area divided by radius) describes a geometric characteristic of a turbine housing where a smaller A/R may increase velocity of exhaust directed to a turbine wheel and provide for increased power of a turbocharger at lower engine speeds (e.g., resulting in a quicker boost rise from a compressor). However, a small A/R may also cause exhaust flow in a more tangential direction, which can reduce flow capacity of a turbine wheel and, correspondingly, tend to increase backpressure. An increase in backpressure can reduce an engine's ability to "breathe" effectively at high engine speeds, which may adversely affect peak engine power. Conversely, use of a larger A/R may lower exhaust velocity. For a turbocharger, lower exhaust velocity may delay boost rise from a compressor. For a larger A/R turbine housing, flow may be directed toward a turbine wheel in a more radial fashion, which can increase effective flow capacity of the turbine wheel and, correspondingly, result in lower backpressure. A decrease in backpressure can allow for increased engine power at higher engine speeds.

As a turbine housing and turbine wheel can create backpressure in an exhaust system, opportunities exist for exhaust leakage. For example, during operation of a turbine, a turbine housing space is at a higher pressure than its environment. Also, since exhaust gas expands across a turbine wheel, pressure downstream of the turbine wheel is considerably lower than that of a turbine housing volute region. Hence, in the foregoing example, two possible regions exist for exhaust leakage.

Exhaust leakage may be of a type that leaks out of an exhaust system to the environment or of a type that remains within an exhaust system yet bypasses a turbine wheel space. As to the latter, such leakage may occur between components of an exhaust turbine, for example, where the components may expand, contract, experience force, etc., as operational conditions vary. Further, where cycling occurs (e.g., as in vehicles), components may wear, become misaligned, etc., as cycle number increases. Whether external or internal, leakage can alter performance of a turbine wheel and turbine housing assembly. For example, a leaky turbine housing may not perform according to its specified A/R, which can complicate engine control, control of a variable geometry mechanism, etc. Various technologies and techniques described herein are directed to seals and sealing that can reduce leakage of exhaust, for example, within a turbine assembly.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
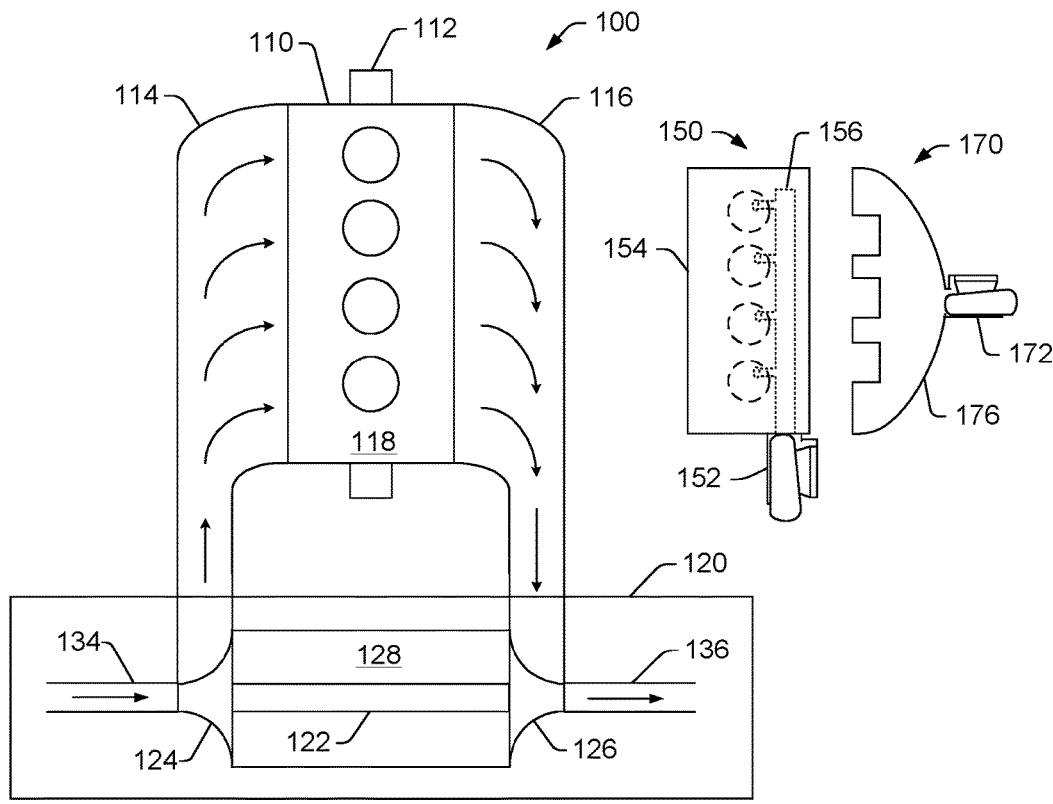
FIG. 1 is a diagram of a turbocharger and an internal combustion engine along with a controller.
Figure 1:
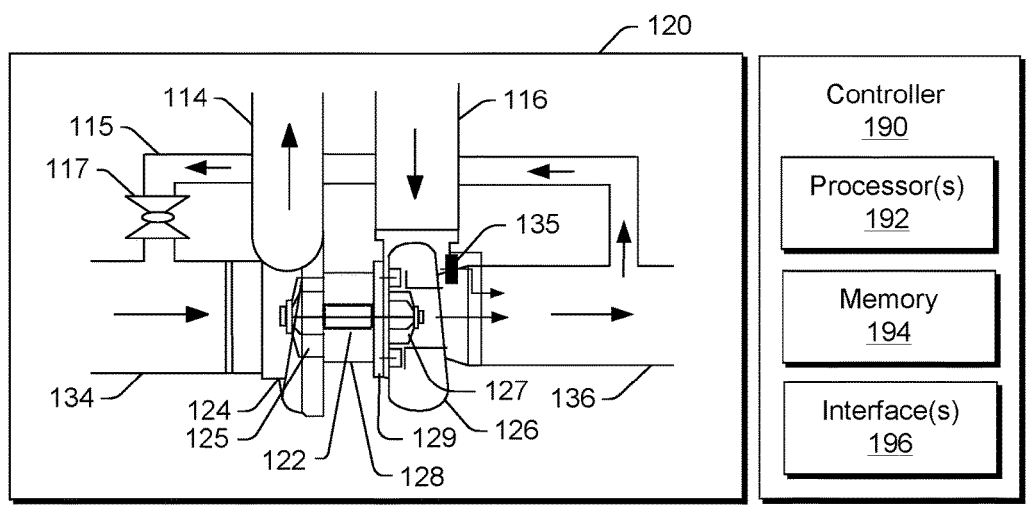

As described in various examples, exhaust leaks may occur in a turbine assembly. For example, exhaust may leak between two components of a turbine assembly such that the leaked exhaust bypasses a turbine wheel space. Where the leaked exhaust passes from a volute of a turbine assembly to an outlet of the turbine assembly, without passing through a turbine wheel space, the efficiency of the turbine assembly may decrease. Where components of a turbine assembly expand, contract, experience force, etc., exhaust leakage may vary and make turbine performance less predictable. Where a turbine wheel drives a compressor wheel to charge intake air for an internal combustion engine, variations in exhaust leakage can impact predictability of engine performance. Further, as many factors may be involved, one may not necessarily know a priori whether a larger pressure drop (e.g., larger backpressure) increases exhaust leakage and, if it does, whether such leakage has any significant impact on performance of a turbine, a compressor, an engine, etc.

As described herein, to mitigate exhaust leakage a turbine assembly may include a seal. For example, a turbine assembly can include a turbine wheel that includes a base, a nose, blades, and a rotational axis that extends from the base to the nose; a shroud component that includes an axis aligned with the rotational axis of the turbine wheel, an inner shroud surface, a lower axial face, an upper axial face and an outer surface that extends between the lower axial face and the upper axial face; a turbine housing that includes an axis aligned with the rotational axis of the turbine wheel, a lower axial face, an upper axial face and an inner surface that extends between the lower axial face and the upper axial face; and a seal that includes an axis aligned with the rotational axis of the turbine wheel, a wall disposed between the outer surface of the shroud component and the inner surface of the turbine housing, and a lower lip extending radially outwardly from the wall at an obtuse angle, the lower lip disposed, at least in part, between the lower axial face of the shroud component and the lower axial face of the turbine housing In the foregoing example, the seal may be deformable responsive to loading. Such deformability may allow the seal to seal a space between two components over a wide range of conditions. For example, a seal may deform responsive to force due to expansion or contraction of one or more components resulting from heating or cooling. As another example, a seal may deform responsive to axial thrust forces that occur during operation of an exhaust turbine (e.g., as in a turbocharger). As yet another example, a seal may deform in response to a load or loads applied to one or more components of a turbine assembly or a turbocharger assembly during an assembly process. In such an example, a bolt or other mechanism may be torqued according to a torque specification that results in a load (e.g., a "pre-load") being applied to a seal seated between two or more components of an assembly.

As a particular example, a seal may be positioned between a cartridge and a turbine housing of a variable geometry turbine assembly (e.g., consider a VGT assembly or a variable nozzle turbine "VNT" assembly). In such an example, there exists a so-called cartridge leakage path for exhaust gas which can be detrimental to performance (e.g., turbocharger performance). One approach to mitigate such leakage involves use of one or more piston rings between the cartridge and the turbine housing. Unfortunately, such an approach may still allow for unacceptable levels of exhaust leakage (e.g., unacceptable in that they negatively impact performance of a turbocharger especially at low engine speed conditions). As described herein, a seal may reduce exhaust leakage in comparison to the aforementioned piston ring approach.

As an example, a seal may act to maintain performance predictability of a turbine or turbocharger by withstanding bulk temperatures of approximately 800° C. and pressure differentials ($\Delta P_{max}$) of approximately 300 kPa. Such a seal may result in lower leak rates than a piston ring approach, which may have a leak rate of approximately 15 to approximately 30 l/min under a pressure differential of approximately 50 kPa. As an example, a seal may provide for lower stack-up limits (e.g., axial stack-up of components) and may comply with thermal evolution/growth during operation (e.g., and temperature cycling). As an example, a seal may be configured to limit load applied to a cartridge. As an example, a seal may be implemented without alteration to existing components (e.g., in terms of structure). For example, where a slot or slots exist for one or more piston rings, a seal may be positioned in a manner where the slot or slots do not alter sealing ability of the seal. As an alternative example, one or more components may be manufactured without machining or otherwise forming one or more slots.

As to pressure differentials and temperatures in a variable geometry turbine assembly, exhaust in a volute may have pressure in a range of approximately 120 kPa to approximately 400 kPa and possible peak pressure of up to approximately 650 kPa (absolute) and temperature in a range of approximately 200 degrees C. to approximately 830 degrees C. and possible peak temperature of up to approximately 840 degrees C.; whereas, at a location downstream blades of a turbine wheel, exhaust may have pressure in a range of approximately 100 kPa to approximately 230 kPa (absolute) and temperature in a range of approximately 100 degrees C. to approximately 600 degrees C. As described herein, as an example, a seal may be made of a material and be configured to withstand pressures and temperatures in such ranges. For example, a seal may be made of a material such as the INCONEL® 718 alloy (Specialty Materials Corporation, New Hartford, N.Y.). The INCONEL® 718 alloy includes nickel (e.g., 50-55% by mass), chromium (e.g., 17-21% by mass), iron, molybdenum, niobium, cobalt, aluminum and other elements. Some other examples of materials include INCONEL® 625, C263 (aluminum-titanium age hardening nickel), Rene 41 (nickel-based alloy), WASPALOY® alloy (age hardened austenitic nickel-based alloy, United Technologies Corporation, Hartford, Conn.), etc. As an example, a seal may be shaped via a stamping process (e.g., for shaping material provided as a sheet, optionally from a roll).

As an example, a seal may be configured for ease of assembly, optionally without any specialized jigs, tools, etc. As an example, upon assembly (e.g., at ambient or room temperature), a seal may be positioned between two or more components and loaded to exert a particular force on a cartridge (e.g., X N) in a first axial direction where another load may be applied to the cartridge (e.g., Y N) by another component in a second, opposing axial direction, for example, to help maintain axial location of the cartridge. In such an example, the load Y applied to the cartridge by the component may exceed the load X applied to the cartridge by the seal (e.g., |Y|>|X|). In such an example, the resulting load on the cartridge (e.g., at ambient or room temperature) may be determined as |Y| minus |X|, in the direction of Y. The resulting load on the cartridge may help maintain its axial location in a turbine assembly (e.g., or in a turbocharger assembly). During operation, for example, where temperature and exhaust pressure are acting simultaneously, the load exerted by the seal may diminish and, in turn, the resulting load experienced by the cartridge may increase. Depending on seal shape, component shape, assembly configuration, etc., load or loads may differ from those of the foregoing example.

As an example, a seal may be deformable in a manner that results in expansion of the seal (e.g., where the seal is expandable), contraction of the seal (e.g., where the seal is compressible) or a combination of expansion and contraction (e.g., where the seal is both expandable and compressible). As an example, a seal may be provided in an unloaded state that provides for an axial expansion or contraction $\Delta z$ characterized by exposing the seal a particular pressure (e.g., approximately 300 kPa) at room temperature as well as at an elevated temperature (e.g., approximately 800 degrees C.). Depending on the particular use, clearance or clearances between components to be sealed, etc., the axial expansion or contraction may be of the order of a few millimeters or less and optionally on the order of a millimeter or less (e.g., for a seal with a lip at each end). As an example, a seal may undergo a negligible level of plastic strain during operation (e.g., at an exhaust temperature of approximately 800 degrees C.). As to a duty cycle of a turbocharger, temperature may vary from approximately 200 degrees C. to approximately 800 degrees C. where load may vary correspondingly. Such variations in load may result in variations of expansion or contraction (e.g., of the order of about 50% of $\Delta z$), which may correspond to variations in a clearance or clearances between two or more components. As an example, a seal may offer near linear stiffness during thermal cycling (e.g., for an expected duty cycle). As an example, a seal may provide for axial expansion or contraction between two or more components, radial expansion or contraction between two or more components or, for example, radial and axial expansion or contraction between two or more components. As mentioned, as an example, a seal may be configured in an assembly for both expansion and contraction.

Below, an example of a turbocharged engine system is described followed by various examples of components, assemblies, methods, etc.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor housing 124 for a compressor wheel 125, a turbine housing 126 for a turbine wheel 127, another housing 128 and an exhaust outlet 136. The housing 128 may be referred to as a center housing as it is disposed between the compressor housing 124 and the turbine housing 126. The shaft 122 may be a shaft assembly that includes a variety of components. The shaft 122 may be rotatably supported by a bearing system (e.g., journal bearing(s), rolling element bearing(s), etc.) disposed in the housing 128 (e.g., a bore defined by one or more bore walls) such that rotation of the turbine wheel 127 causes rotation of the compressor wheel 125 (e.g., as rotatably coupled by the shaft 122).

In the example of FIG. 1, a variable geometry assembly 129 is shown as being, in part, disposed between the housing 128 and the housing 126. Such an assembly may include vanes or other components to vary geometry of passages that lead to a turbine wheel space in the turbine housing 126. As an example, a variable geometry compressor unit may be provided.

In the example of FIG. 1, a wastegate valve (or simply wastegate) 135 is positioned proximate to the inlet of the turbine 126. The wastegate valve 135 can be controlled to allow exhaust from the exhaust port 116 to bypass the turbine 126. Further, an exhaust gas recirculation (EGR) conduit 115 may be provided, optionally with one or more valves 117, for example, to allow exhaust to flow to a position upstream the compressor wheel 125.

FIG. 1 also shows an example arrangement 150 for flow of exhaust to an exhaust turbine housing 152 and another example arrangement 170 for flow of exhaust to an exhaust turbine housing 172. In the arrangement 150, a cylinder head 154 includes passages within to direct exhaust from cylinders to the turbine housing 152 while in the arrangement 170, a manifold 176 provides for mounting of the housing 172, for example, without any separate, intermediate length of exhaust piping. In the example arrangements 150 and 170, the turbine housings 152 and 172 may be configured for use with a variable geometry assembly such as the assembly 129 or, for example, other assemblies described herein.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions (e.g., turbo rpm, engine rpm, temperature, load, lubricant, cooling, etc.). For example, sensors may transmit information to the controller 190 via the one or more interfaces 196. Control logic may rely on such information and, in turn, the controller 190 may output control signals to control engine operation. The controller 190 may be configured to control lubricant flow, temperature, a variable geometry assembly (e.g., variable geometry compressor or turbine), a wastegate, an electric motor, or one or more other components associated with an engine, a turbocharger (or turbochargers), etc.

Figure 2:
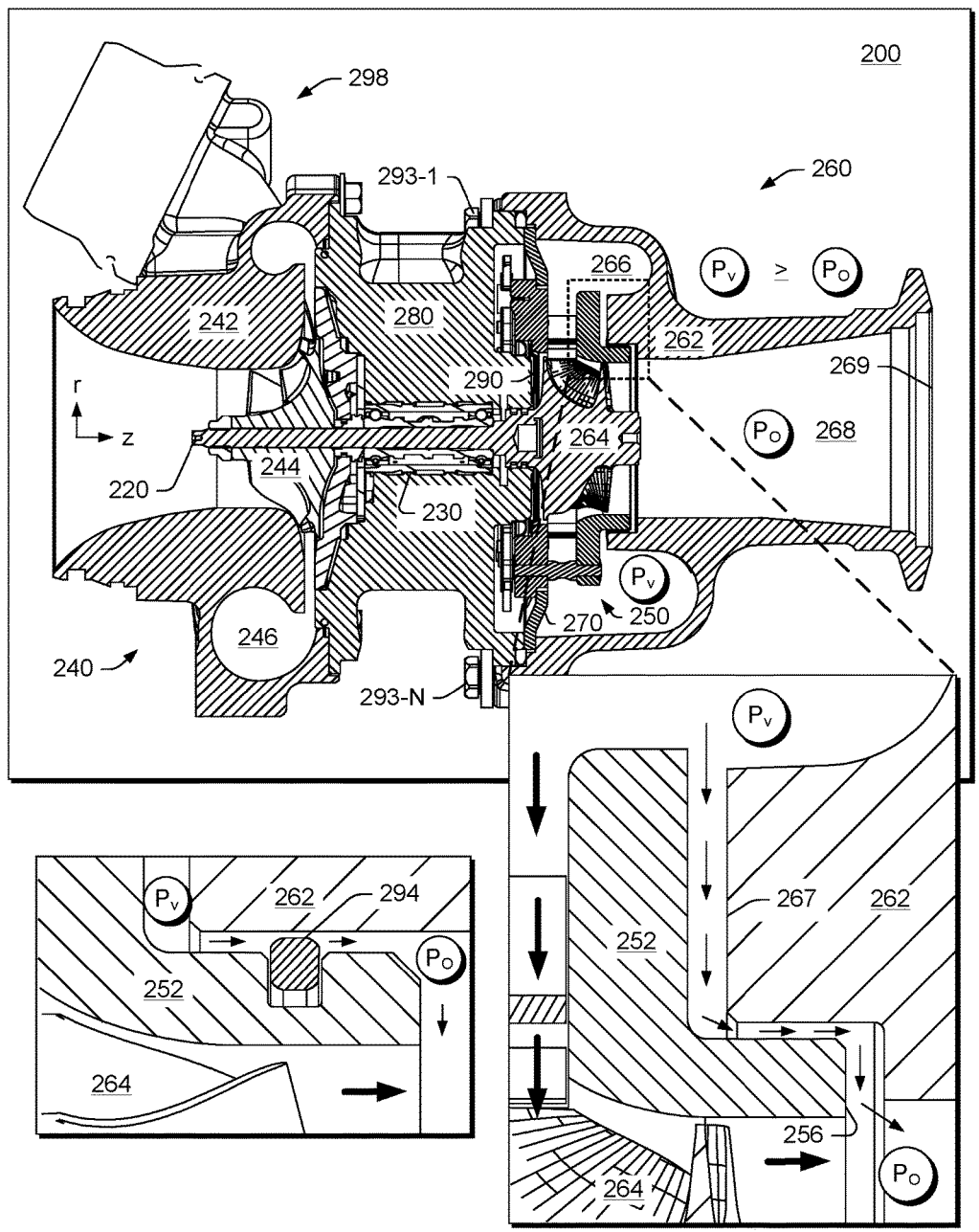
FIG. 2 is a cross-sectional view of an example of a turbocharger assembly.

FIG. 2 shows an example of a turbocharger assembly 200 that includes a shaft 220 supported by a bearing assembly 230 (e.g., a rolling element bearing with an outer race) disposed in a bore (e.g., a through bore defined by one or more bore walls) of a housing 280 between a compressor assembly 240 and a turbine assembly 260. The compressor assembly 240 includes a compressor housing 242 that defines a volute 246 and that houses a compressor wheel 244. The turbine assembly 260 includes a turbine housing 262 that defines a volute 266 and that houses a turbine wheel 264. The turbine wheel 264 may be, for example, welded or otherwise attached to the shaft 220 to form a shaft and wheel assembly ("SWA") where a free end of the shaft 220 allows for attachment of the compressor wheel 244.

The turbine assembly 260 further includes a variable geometry assembly 250, which may be referred to as a "cartridge", that is positioned using a flange 270 (e.g., optionally shaped as a stepped annular disc) that clamps between the housing 280 and the turbine housing 262, for example, using bolts 293-1 to 293-N and a heat shield 290 (e.g., optionally shaped as a stepped annular disc), the latter of which is disposed between the cartridge 250 and the housing 280. As shown in the example of FIG. 2, the cartridge 250 is positioned between the flange 270 and the heat shield 290 where the heat shield may exert a load in a direction axially outward, away from the housing 280; noting that in the example of FIG. 2, the turbine housing 262 does not directly contact the cartridge 250. As to the flange 270 and the heat shield 290, they may have an outer radius and an inner radius where the inner radius of the flange 270 exceeds the outer radius of the heat shield 290 and where the flange 270 and the heat shield 290 may be centered on an axis (e.g., rotational axis of the shaft 220) and may optionally be positioned within a common plane (e.g., a plane orthogonal to the axis). As shown in FIG. 2, a portion of the cartridge 250 occupies a space between the outer radius of the heat shield 290 and the inner radius of the flange 270.

As to exhaust flow, higher pressure exhaust in the volute 266 passes through passages of the cartridge 250 to reach the turbine wheel 264 as disposed in a turbine wheel space defined by the cartridge 250 and the turbine housing 262. After passing through the turbine wheel space, exhaust travels axially outwardly along a passage 268 defined by a wall of the turbine housing 262 that also defines an opening 269 (e.g., an exhaust outlet). As indicated, during operation of the turbocharger 200, exhaust pressure in the volute 266 ($P_V$) is greater than the exhaust pressure in the passage 268 ($P_O$).

As shown in two enlarged views of the example of FIG. 2, a clearance exists between the turbine housing 262 and the cartridge 250. Specifically, a clearance exists between a surface 256 of a component 252 of the cartridge 250 and a surface 267 of the turbine housing 262. As mentioned, a piston ring approach to sealing a passage formed by a clearance can involve positioning a piston ring in a slot. The enlarged views of FIG. 2 show an example without a piston ring (lower right) and another example with a piston ring 294 positioned in an effort to seal such a passage (lower left). As described herein, a seal may be used in an effort to seal such a passage. Depending on size, shape, orientation of a seal in an assembly, a piston ring may optionally be included to assist with sealing.

Figure 3:
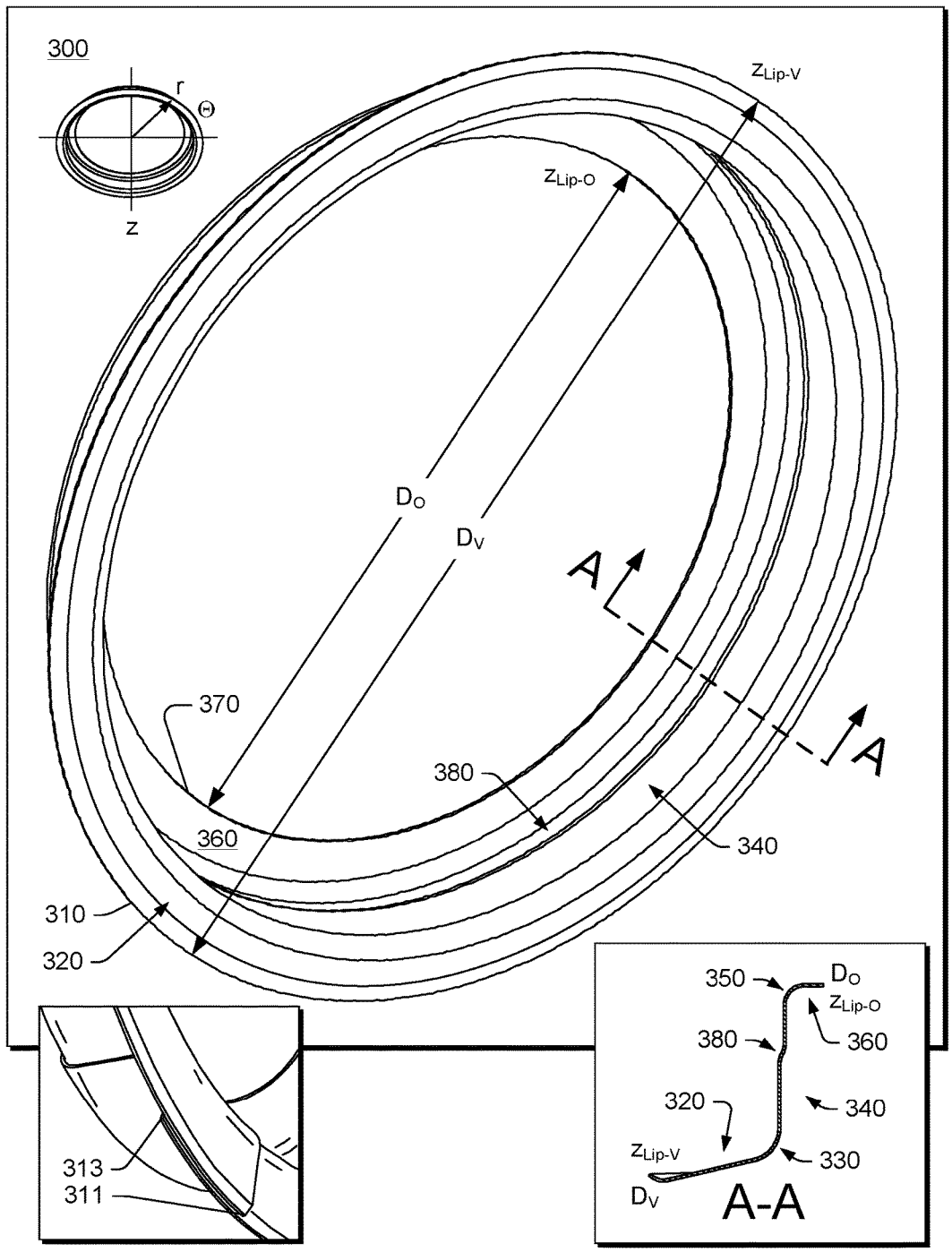
FIG. 3 is a series of views of an example of a seal optionally suitable for use with the turbocharger of FIG. 2.

FIG. 3 shows an example of a seal 300, which may be formed as a contiguous ring or optionally with overlapping ends 311 and 313. The seal 300 may be defined with respect to a cylindrical coordinate system having radial, axial and azimuthal coordinates r, z and Θ, respectively. In the example of FIG. 3, the seal 300 includes an edge 310 of a lip 320 that leads to a wall 340 that extends to another lip 360 having an edge 370. As shown, the wall 340 may optionally include a bend 380, for example, where radius of the wall 340 changes with respect to axial distance along the wall 340.

In the example of FIG. 3, the edge 310 may be characterized by a diameter $D_V$ at an axial position $z_{Lip-V}$ while the edge 370 may be characterized by a diameter $D_O$ at an axial position $z_{Lip-O}$ where, for example, the subscript "V" may represent "volute" while the subscript "O" may represent "outlet" for an outlet side of the seal 300.

A cross-sectional view along a line A-A of the seal 300 is also shown in FIG. 3 to illustrate a bend 330 between the lip 320 and the wall 340 and another bend 350 between the wall 340 and the lip 360 as well as the optional bend 380. As to deformation, the lip 320 and the lip 360 may flex with respect to the wall 340 where such flexure changes angles of the bends 330 and 350 to increase axial distance between the edge 310 and the edge 370. As an example, the bend 330 is shown with respect to an angle Φ, formed between the wall 340 and the lip 320, which may be an obtuse angle. As an example, the bend 350 may be at an angle of approximately 90 degrees (e.g., approximately a right angle), formed between the wall 340 and the lip 360.

As mentioned, a seal may be formed by a stamping process, for example, where a sheet of material is stamped and optionally cut to form a seal such as the seal 300 of FIG. 3. As another example, a rolling process may be implemented to shape material from a roll, which may be cut into pieces. For example, a rolling process may form pieces with ends that can form a ring, optionally with overlap (see, e.g., ends 311 and 313).

Figure 4:
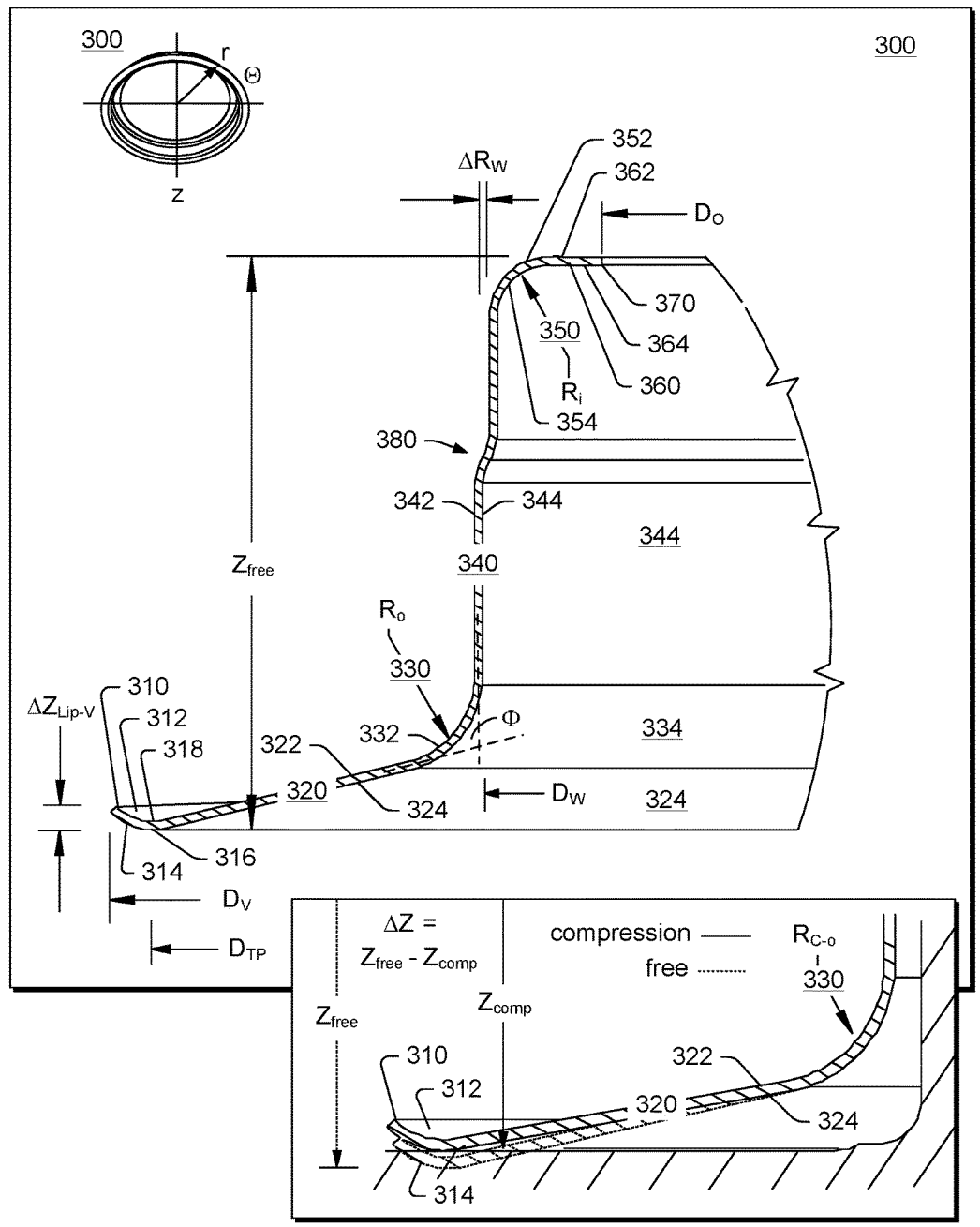
FIG. 4 is a cutaway view of the seal of FIG. 3.

FIG. 4 shows a cutaway view of the seal 300 of FIG. 3 along with a view of the lip 320 in a compression state (e.g., flexed or "deformed" state in solid lines) and in a free state (e.g., dashed lines). As shown in the example of FIG. 4, the seal 300 includes an inner surface and an outer surface. The inner and the outer surfaces extend from the edge 310 to the edge 370. As shown, inner surfaces include an inner surface 314 of an axially downwardly sloping portion of the lip 320, a transition point 316 (e.g., an annular contact line or surface), an inner surface 324 of an axially upwardly sloping portion of the lip 320, an inner surface 334 of the bend 330, an inner surface 344 of the wall 340, an inner surface 354 of the bend 350, and an inner surface 364 of the lip 360, which may optionally be substantially flat (e.g., without an upward or downward slope). In the example of FIG. 4, outer surfaces include an outer surface 312 of the axially downwardly sloping portion of the lip 320, a transition point 318 (e.g., an annular line or surface), an outer surface 322 of the axially upwardly sloping portion of the lip 320, an outer surface 332 of the bend 330, an outer surface 342 of the wall 340, an outer surface 352 of the bend 350, and an outer surface 362 of the lip 360, which may optionally be substantially flat (e.g., without an upward or downward slope). As an example, a transition (e.g., axially upwardly turned end) may action to concentrate force, for example, to enhance sealing and, for example, to also achieve desired loading between components. As an example, a transition surface (e.g., corresponding to the transition point 316) may be treated, conditioned, etc., for example, to enhance sealing, reduce wear, etc. (e.g., consider a surface treatment such as polishing, etc., which may help achieve more even sealing azimuthally).

Various dimensions are shown in FIG. 4, including a free axial distance $Z_{free}$, a compressed axial distance $Z_{comp}$ and a lip deviation $\Delta Z$ (e.g., for movement of the lip 320, particularly the edge 310 or the transition point 316 between a free or uncompressed state and a compression state, where $\Delta Z$ may be defined as $Z_{free} - Z_{comp}$), a distance $\Delta Z_{Lip-V}$ (e.g., between a transition point 316 and the edge 310), a wall width $\Delta R_W$, a wall diameter $D_W$ (e.g., which may vary depending on presence of the optional bend 380), an edge diameter $D_V$, a transition point diameter $D_{TP}$, and an edge diameter $D_O$, and a bend radius $R_o$ and a bend radius $R_i$ and a compressed bend radius $R_{C-o}$ (e.g., as the bend 330 may optionally change for flexing between free and compression states).

When installed, the seal 300 may be configured to flex, expand, contract, etc. (e.g., due to force, temperature, etc.) where the lower lip 320 maintains an obtuse angle at the bend 330 with respect to the wall 340, for example, an obtuse angle greater than approximately 90 degrees. As an example, the upper lip 360 may optionally maintain an approximately right angle at the bend 350 with respect to the wall 340, for example, while compression is applied to the seal 300 (e.g., when positioned between two or more components). As an example, the optional bend 380 may substantially maintain its shape while compression is applied to the seal 300. In the example of FIG. 4, the compressed bend radius $R_{C-o}$, the lip deviation $\Delta Z$ or one or more other parameters may be considered as being specified as part of a set of operational limits for a compressed state (e.g., a prolonged compression state).

Figure 5:
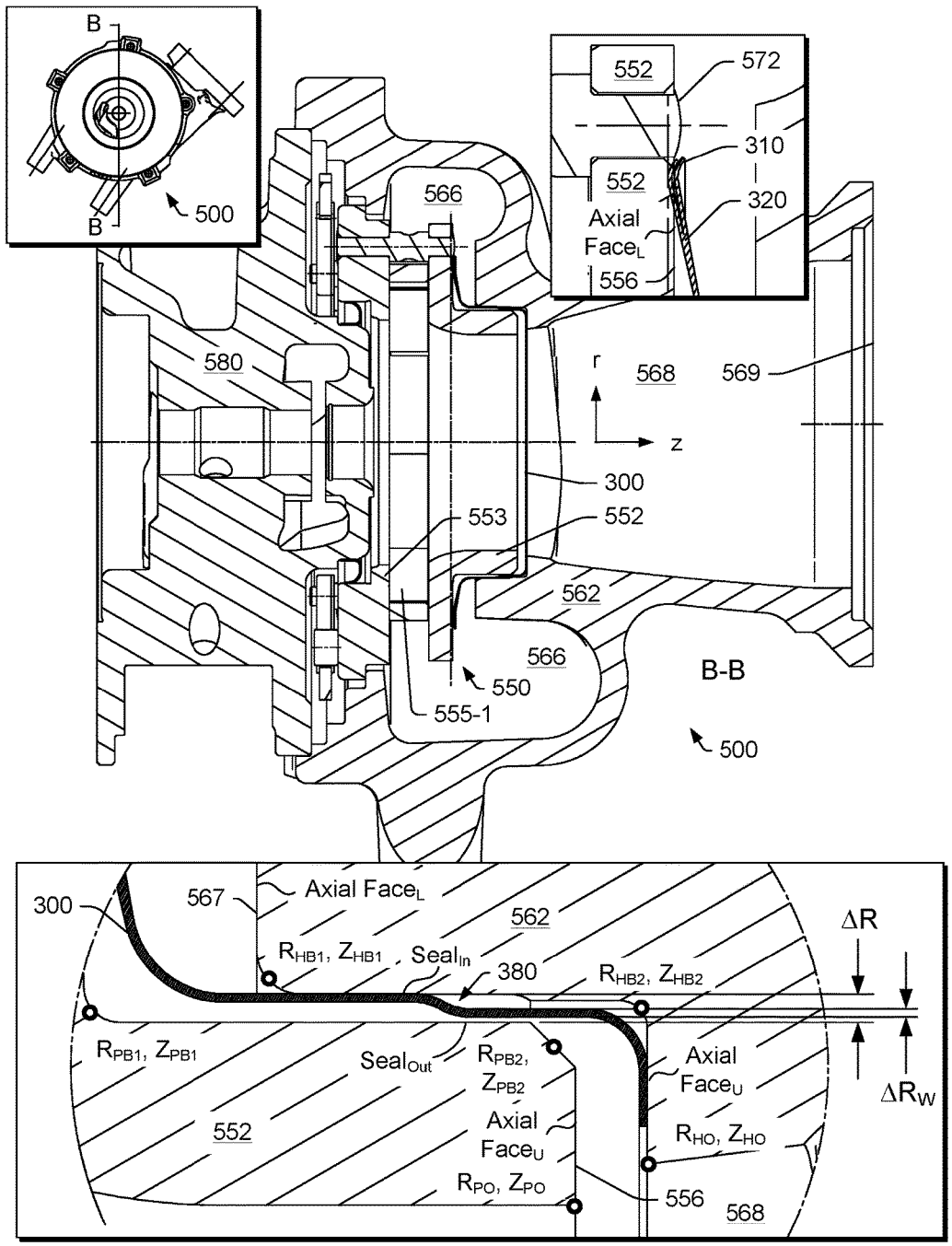
FIG. 5 is a cross-sectional view of a portion of a turbocharger assembly that includes the seal of FIGS. 3 and 4.

FIG. 5 shows a plan view of a portion of an assembly 500, a cross-sectional view of the portion of an assembly 500 (along line B-B) and two enlarged cross-sectional views where various components include reference numerals in the 500s, which may generally correspond to reference numerals in the 200s of the example of FIG. 2. For example, as for the assembly 200 of FIG. 2, the assembly 500 includes a cartridge 550 disposed between a turbine housing 562 and a center housing 580, however, the assembly 500 now includes the seal 300 (e.g., in a compression state). In FIG. 5, the assembly 500 is shown as including a volute 566, as defined at least in part by the turbine housing 562, a passage 568, as defined at least in part by the turbine housing 562, a vane 555-1 disposed in an exhaust passage defined by the cartridge 550 (e.g., a passage defined by the component 552 and another component 553 of the cartridge 550) where the passage 568 extends between the volute 566 and an opening 569 of the turbine housing 562.

As mentioned, exhaust leakage between components such as the component 552 and the turbine housing 562 may be detrimental to performance of an exhaust turbine. Accordingly, in the example of FIG. 5, the seal 300 is disposed between the component 552 of the cartridge 550 and the turbine housing 562 in an effort to avoid such exhaust leakage (e.g., to help ensure exhaust flows from the volute 566 via a throat or throats to a turbine wheel space).

As shown, with respect to various coordinates, clearances between a surface 556 of the component 552 and a surface 567 of the turbine housing 562 define a passage in which the seal 300 may be at least in part disposed. In the example of FIG. 5, the component 552 may be referred to as a "pipe" as it has a cylindrical end that forms an outlet for exhaust downstream blades of a turbine wheel or it may be referred to as a shroud component as it forms a shroud for a turbine wheel along an inner surface or it may be referred to as an insert as it is partially inserted into a recess defined by the turbine housing 562.

In the example of FIG. 5, the subscript "P" refers to "pipe" (i.e., the component 552) whereas the subscript "H" refers to the turbine housing 562; the subscript "V" refers to volute and the subscript "O" refers to outlet, generally a position or positions downstream blades of a turbine wheel; and the subscript "B" refers to bend for one of the various bends (e.g., or shoulders, etc.).

FIG. 5 also includes labels for a lower axial face and an upper axial face of the component 552, a lower axial face and an upper axial face of the turbine housing 564, and an outer seal surface (Seal$_{Out}$) of the component 552 and an inner seal surface (Seal$_{In}$) of the component 562 (e.g., the turbine housing). As an example, the outer seal surface of the component 552 may be referred to as an outer surface of the component 552 and the inner seal surface of the component 562 may be referred to as an inner surface of the component 562, for example, where the wall 340 of the seal 300 is disposed between the outer surface and the inner surface and where the wall 340 may or may not contact the outer surface, the inner surface or the outer surface and the inner surface.

FIG. 5 further shows an enlarged view of the lip 320 of the seal 300 where the lip 320 may be configured to avoid contact with a substantially domed surface of a component 572, which may be part of the cartridge 550 (e.g., a bolt, a stud, etc.), for example, to connect, locate, etc. the components 552 and 553 (e.g., to define axial throat height, etc.). In such an example, the transition point 316 of the seal 300 may substantially maintain contact with a surface of the component 552, for example, without contacting the component 572 (e.g., which may cause displacement of the lip 320, etc.).

As an example, the seal 300 can substantially maintain its position during service while contacting the component 552 and contacting the component 562 (e.g., a turbine housing). As an example, the seal 300 may contact the component 552 (e.g., elastic spring compression) at or near a volute and contact the component 562 at a wall (e.g., a press fit) and optionally at or near an outlet (e.g., which may help control positioning during assembly). As an example a seal may include contacting a turbine housing (e.g., via elastic spring force) at or near a volute and include contacting a pipe (e.g., via elastic spring force) at or near an outlet. As an example, a seal may be configured oppositely (e.g., pipe at or near volute and housing at or near outlet). As an example, a seal may be under compression in an assembly; a seal may be under tension in an assembly; or a seal may be under compression and tension in an assembly (e.g., depending on shape, contacts, components, etc.). As an example, where a seal's length (e.g., axial length) is shortened upon assembly, the seal may be considered to be in a compression state while where a seal's length (e.g., axial length) is lengthened upon assembly, the seal may be considered to be in a tension state; noting that, depending on shape, contacts, components, etc., as an example, an interference fit may introduce tension, compression, etc. (e.g., depending on whether a seal has a smaller dimension than a component or a larger dimension than a component for purposes of such an interference fit).

As shown in the example of FIG. 5, the seal 300 may form a seal along a portion of the lip 320 and the lower axial face of the component 552 (e.g., a surface 556 that extends along the component 552), may form a seal along a portion of the wall 340 and the inner seal surface (Seal$_{In}$) of the component 562 (e.g., the turbine housing), and may form a seal along a portion of the lip 360 and the upper axial face of the component 562 (e.g., the turbine housing). As an example, the seal 300 may form a seal along a portion of the wall 340 and the outer seal surface (Seal$_{Out}$) of the component 552. As an example, where expansion or contraction may occur, a seal may be maintained along one or more surfaces of the seal and a seal released, formed, etc. along one or more other surfaces. For example, upon contraction, the wall of the seal 340 may migrate from being in contact with the component 562 (e.g., the turbine housing) to being in contact with the component 552. In such an example, where the wall 340 includes the optional bend 380, the seal portions of the wall 340 may be axially to one side of the bend 380 for contacting the component 562 and axially to another side of the bend 380 for contacting the component 552.

In the example of FIG. 5, a radial clearance (ΔR) exists between the components 552 and 562, which is shown along with a wall thickness for the seal 300 (ΔR$_W$). Where the seal 300 includes the optional bend 380, the effective radial span of the wall 340 of the seal 300 may be about twice the wall thickness ΔR$_W$, for example, while being less than the radial clearance ΔR.

As an example, a seal may be configured to be press fit (e.g., interference fit) along an inner diameter, an outer diameter or both an inner diameter and an outer diameter. As an example, a wall may include a bend such as the bend 380 that provides for "splitting" the wall into two portions, an upper portion and a lower portion, where the portions may be offset in a manner that allows for press-fitting the seal with respect to one or more components. In such an example, the location of the bend may determine an amount of surface area to be contacted, whether by a press fit, etc., for example, to form a seal. As an example, a seal may be press fit into a turbine housing along an outer diameter of a wall of the seal.

As mentioned, a clearance or clearances between components may change with respect to various conditions. For example, in the example of FIG. 5, the (R, Z) coordinates may change and thereby alter one or more clearances (e.g., as one or more surface positions change). In response, the seal 300 may expand or contract while still acting as a hindrance for flow of exhaust from the volute 566 to the passage 568 in the space defined by the surfaces 556 and 567 of the components 552 and 562, respectively.

Figure 6:
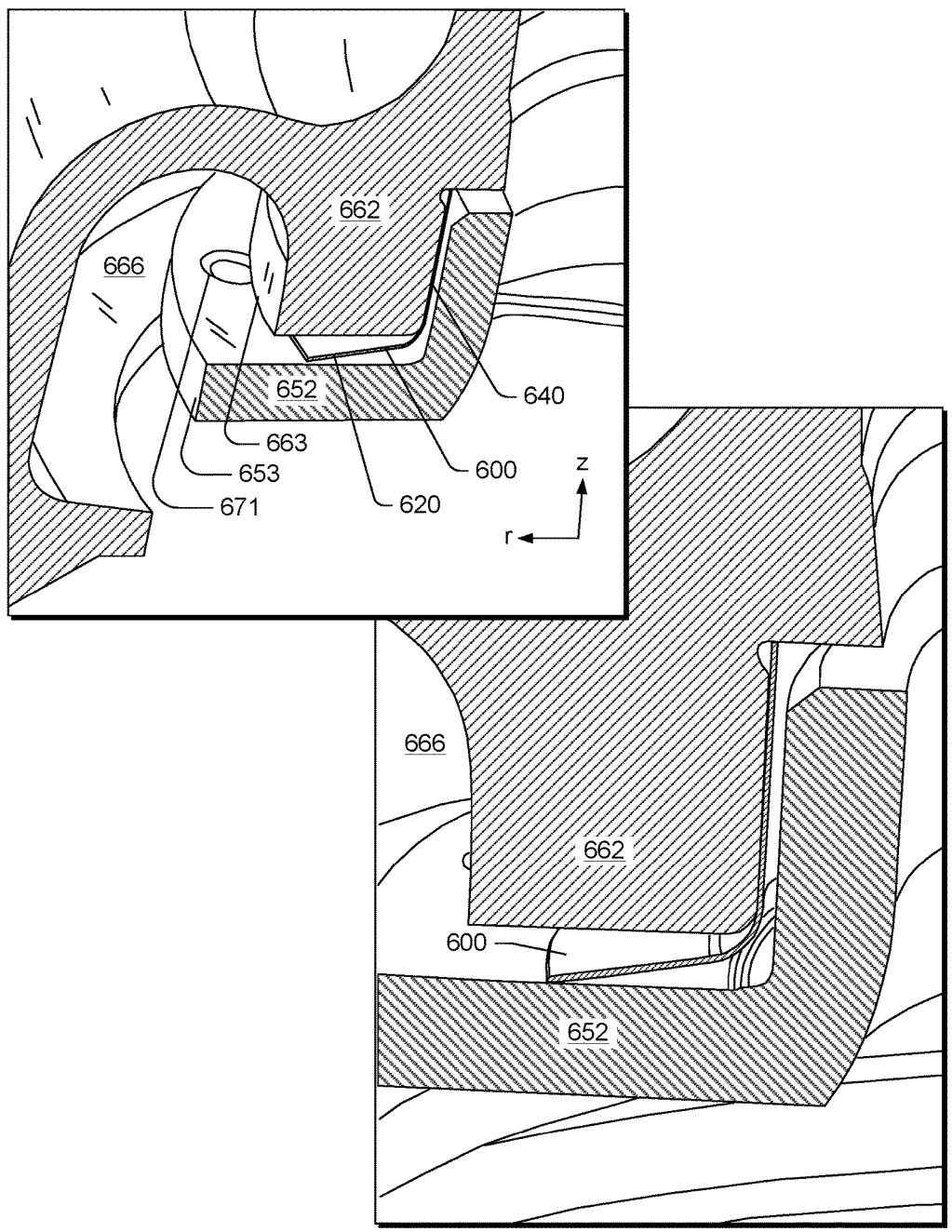
FIG. 6 is a cross-sectional view of a portion of a turbocharger assembly that includes an example of a seal.

FIG. 6 shows two cross-sectional views of an example of a seal 600 with respect to two components 652 and 662, which may be, for example, a pipe and a turbine housing. In the example of FIG. 6, the seal is disposed between the two components 652 and 662 to form an exhaust seal. As shown, an upper edge of the seal 600 may be blunt and contact an axial face of the component 662, for example, where the seal 600 has a L-shaped cross-section with a bend that forms an obtuse angle between an annular wall 620 and a cylindrical wall 640.

In the example of FIG. 6, the component 652 includes an aperture 671, for example, to receive a bolt, a spacer, a stud, etc. As shown, an end 653 of the component 652 extends into a volute 666, for example, substantially at a right angle an end 663 of the component 662 that forms, in part, the volute 666. As shown in the example of FIG. 6, the substantially L-shaped seal 600 does not extend beyond the end 663 of the component 662 and hence does not extend into the volute 666. Where a bolt, spacer, stud, etc. is positioned in the aperture 671, the wall 620 of the seal 600 may extend to a radial position that does not contact a portion of the bolt, spacer, stud, etc. (e.g., to avoid displacement of the annular wall 620).

Figure 7:
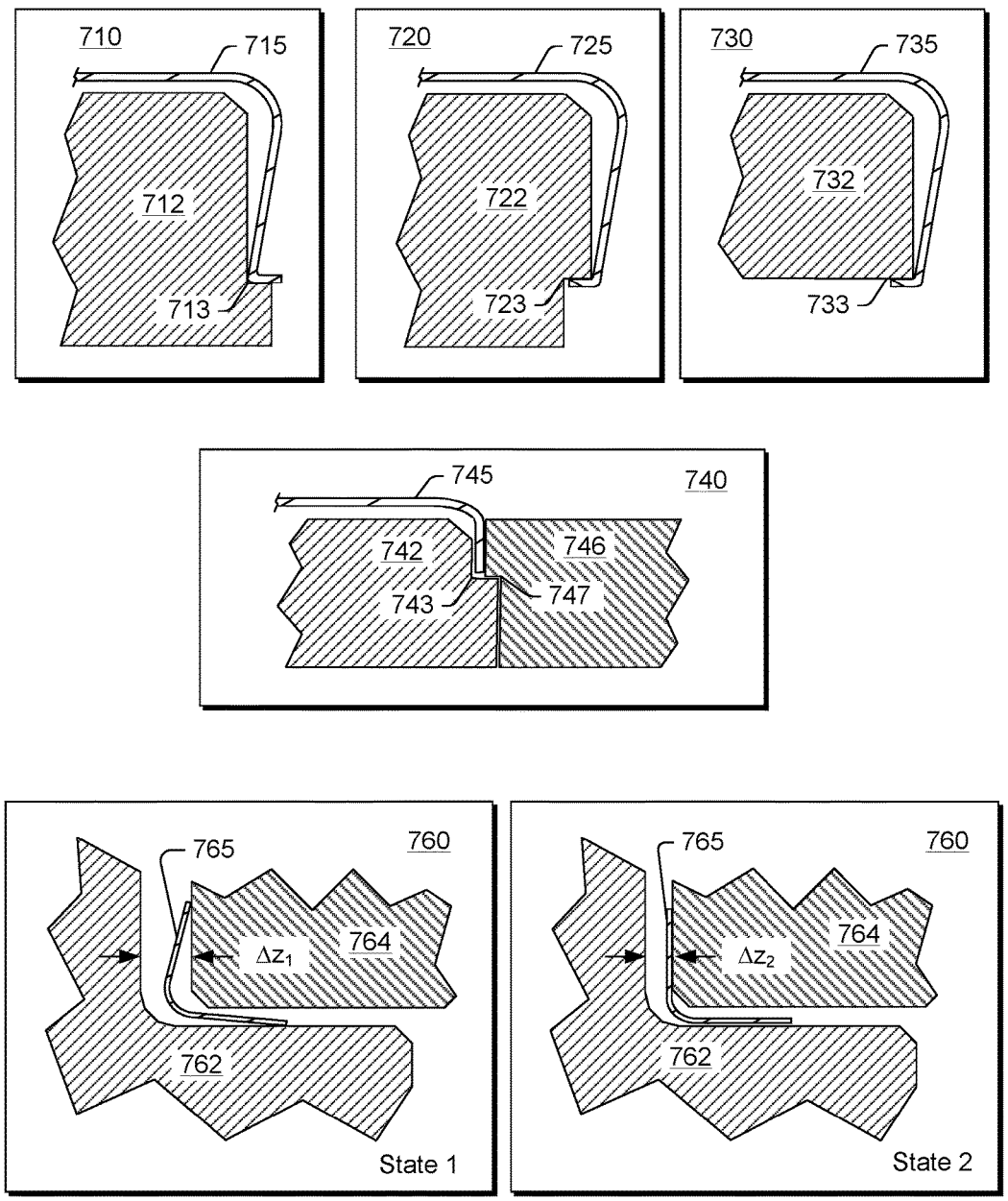
FIG. 7 is a series of cross-sectional views of examples of assemblies that include a seal.

FIG. 7 shows various examples of seals in cross-sectional views (e.g., through a cylindrically shaped portion of an assembly). An example assembly 710 shows a seal 715 configured for seating with an outwardly facing end against a shoulder 713 of a component 712. An example assembly 720 shows a seal 725 configured for seating with an inwardly facing end against a shoulder 723 of a component 722. An example assembly 730 shows a seal 735 configured for seating with an inwardly facing end against a surface of a component 732. An example assembly 740 shows a seal 745 as disposed between two components 742 and 746, for example, where a shoulder 743 of the component 742 aligns with a shoulder 747 of the component 746. As shown, an end of the seal 745 sits in a gap between the two components 742 and 746, which may form a "pipe" of a cartridge for passage of exhaust. In the foregoing examples, the seals 715, 725, 735 and 745 may be provided in a relaxed state and then tensioned between two or more components of the assemblies 710, 720, 730 and 740 (e.g., or optionally compressed, depending on arrangement of components, shape of the seals, etc.).

FIG. 7 also shows an example of a seal 765 as part of an assembly 760 in a first state and a second state. The seal 765 includes a single lip and a wall where the lip and wall form an acute angle. In the first state, the seal 765 is positioned between a component 762 and a component 764 while maintaining the acute angle where a clearance $\Delta z_1$ exists between surfaces of the components 762 and 764. In the second state, the clearance is narrowed to $\Delta z_2$ and the seal "expands" under tension such that the angle between the lip and the wall approaches approximately 90 degrees. To maintain its expandability, the seal 765 may be configured for positioning in an assembly where the angle between the lip and the wall does not exceed approximately 90 degrees as the material may deform to an extent where it loses some of its springiness or elasticity.

Figure 8:
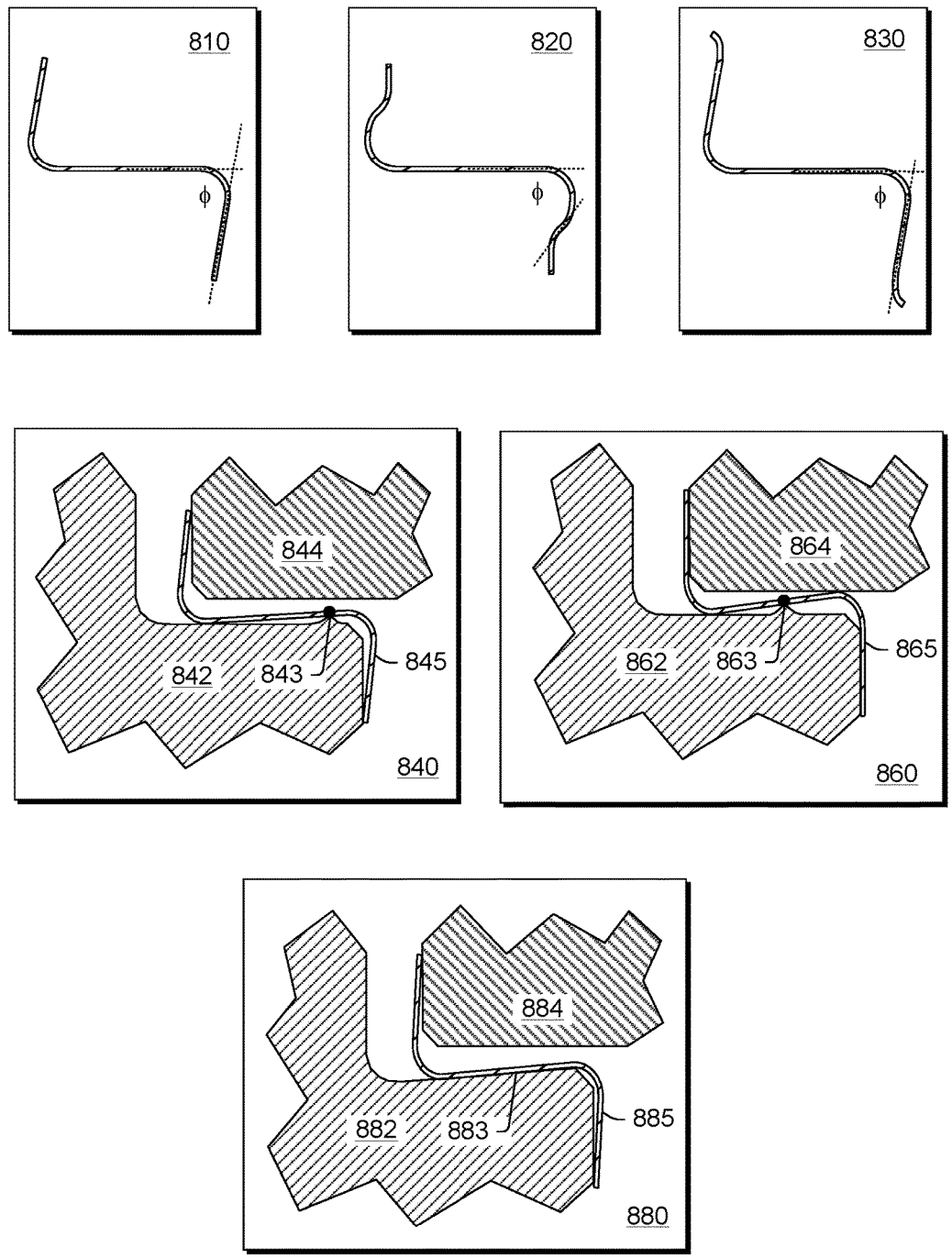
FIG. 8 is a series of cross-sectional views of examples of seals and examples of assemblies that include a seal.

FIG. 8 shows various examples of seals 810, 820 and 830. The seal 810 includes an angle ϕ between a wall and a lip, which may be an acute angle. The seal 820 includes an angle ϕ between a wall and a portion of a lip, which may be an acute angle. The seal 830 includes an angle ϕ between a wall and a portion of a lip, which may be an acute angle. As to the seal 820, it includes a ridged lip, for example, which may be an annular ridge characterized by a radius. In such an example, the ridge may provide for contact a radial distance from an edge and may help to avoid contact between the seal and a sharp edge of a component. As to the seal 830, an edge of a lip may be angled, for example, to avoid contact between an edge of the seal and a component.

FIG. 8 also shows examples of three assemblies 840, 860 and 880 where a component may include one or more features that cooperate with a seal. In the assembly 840, a seal 845 is disposed between a component 842 and a component 844 where the component 842 includes an outwardly extending ridge (or ridges or bumps) that act as contact points or leverage points for the seal 845. Such a feature or features may alter the manner by which force is applied by the seal, for example, where a particular force or force profile is to be maintained. Further, such a feature or features may help to enhance sealing, for example, by direct contact or by altering force under one or more conditions (e.g., temperature, pressure, thrust, etc.). As an example, a contact or leverage feature or features may enable a seal to be retained within or with respect to another component, which may aid assembly (e.g., where the seal remains paired during logistics and during assembly with other components).

In the assembly 860, a seal 865 is disposed between a component 862 and a component 864 where the component 862 includes an outwardly extending ridge (or ridges or bumps) that act as contact points or leverage points for the seal 865. In comparison to the ridge 843 of the example assembly 840, the ridge 863 is positioned at a different location, which may cause the seal 865 to contact the component 862 and the component 864, optionally via control deformation or position (e.g., where the ridge 863 acts as a fulcrum). As mentioned, a contact or leverage feature or features may enable a seal to be retained within or with respect to another component, which may aid assembly (e.g., where the seal remains paired during logistics and during assembly with other components).

In the assembly 880, a seal 885 is disposed between a component 882 and a component 884 where the component 882 includes a surface 883 disposed at a radius that increases with respect to axial position. The surface 883 may act to form more intimate contact (e.g., over a larger portion) of the seal 885. As mentioned, a contact or leverage feature or features may enable a seal to be retained within or with respect to another component, which may aid assembly (e.g., where the seal remains paired during logistics and during assembly with other components).

Figure 9:
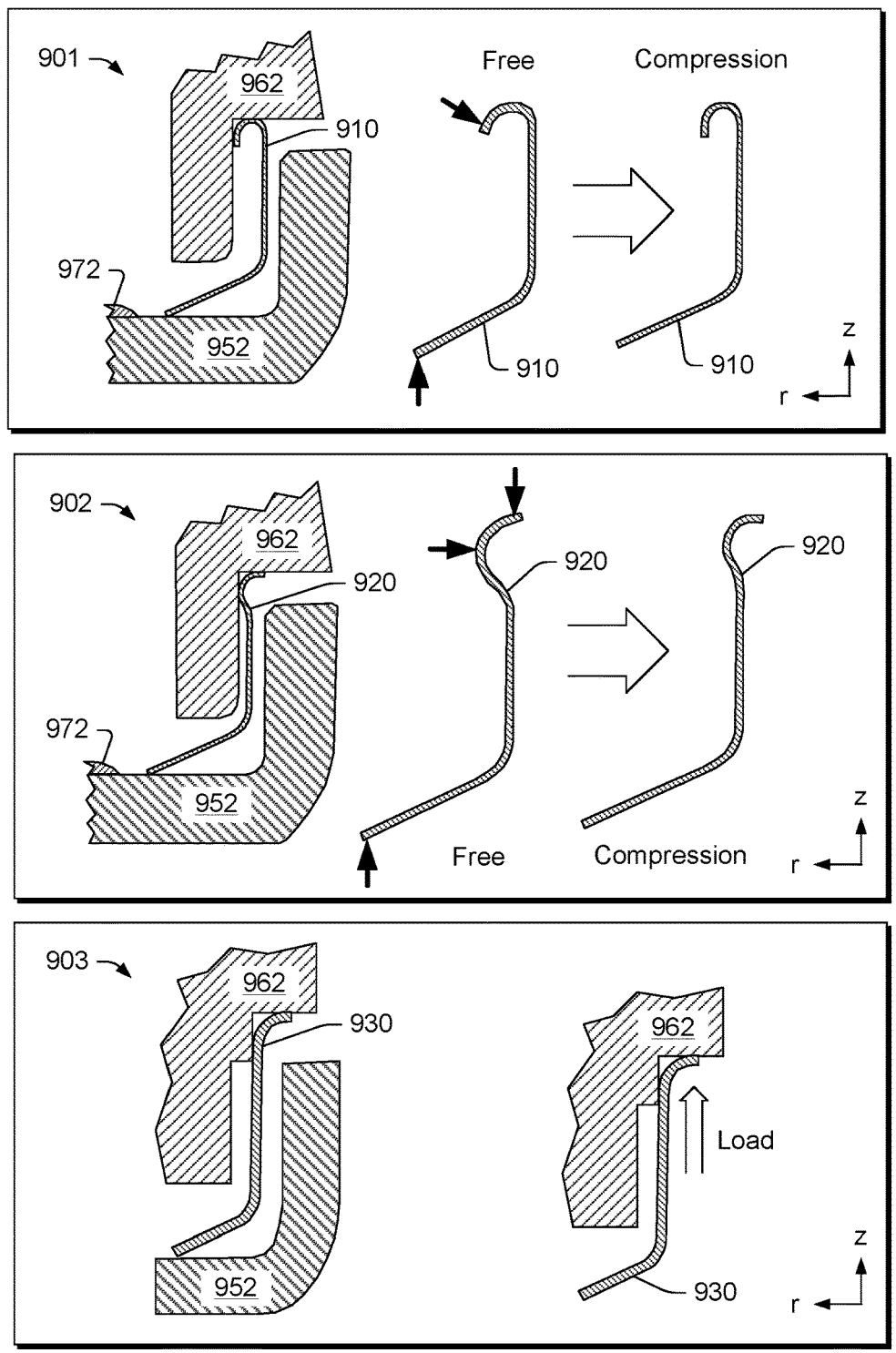
FIG. 9 is a series of cross-sectional views of examples of seals.

FIG. 9 shows example assemblies 901, 902 and 903 that include examples of seals 910, 920 and 930. As shown, the assemblies 901, 902 and 903 include two components 952 and 962 between which one of the example seals is disposed 910, 920 or 930. Also shown in the assemblies 901 and 902 is a bolt, spacer, stud, etc. 972.

As to the seal 910, it includes an upper, outwardly hooked end and a lower straight end. Upon assembly, force may be applied to the hooked end and the straight end to compress the seal 910, as indicated by force arrows with respect to a free state of the seal 910 to achieve a compression state of the seal 910.

As to the seal 920, it includes an upper, inwardly hooked end and a lower straight end. Upon assembly, force may be applied to the hooked end and the straight end to compress the seal 920, as indicated by force arrows with respect to a free state of the seal 920 to achieve a compression state of the seal 920.

As to the seal 930, it includes an upper, curved end and a lower straight end. Upon assembly, force may be applied such that load is transferred to the seal 930 where the upper, curved end of the seal 930 contacts the component 962.

Figure 10:
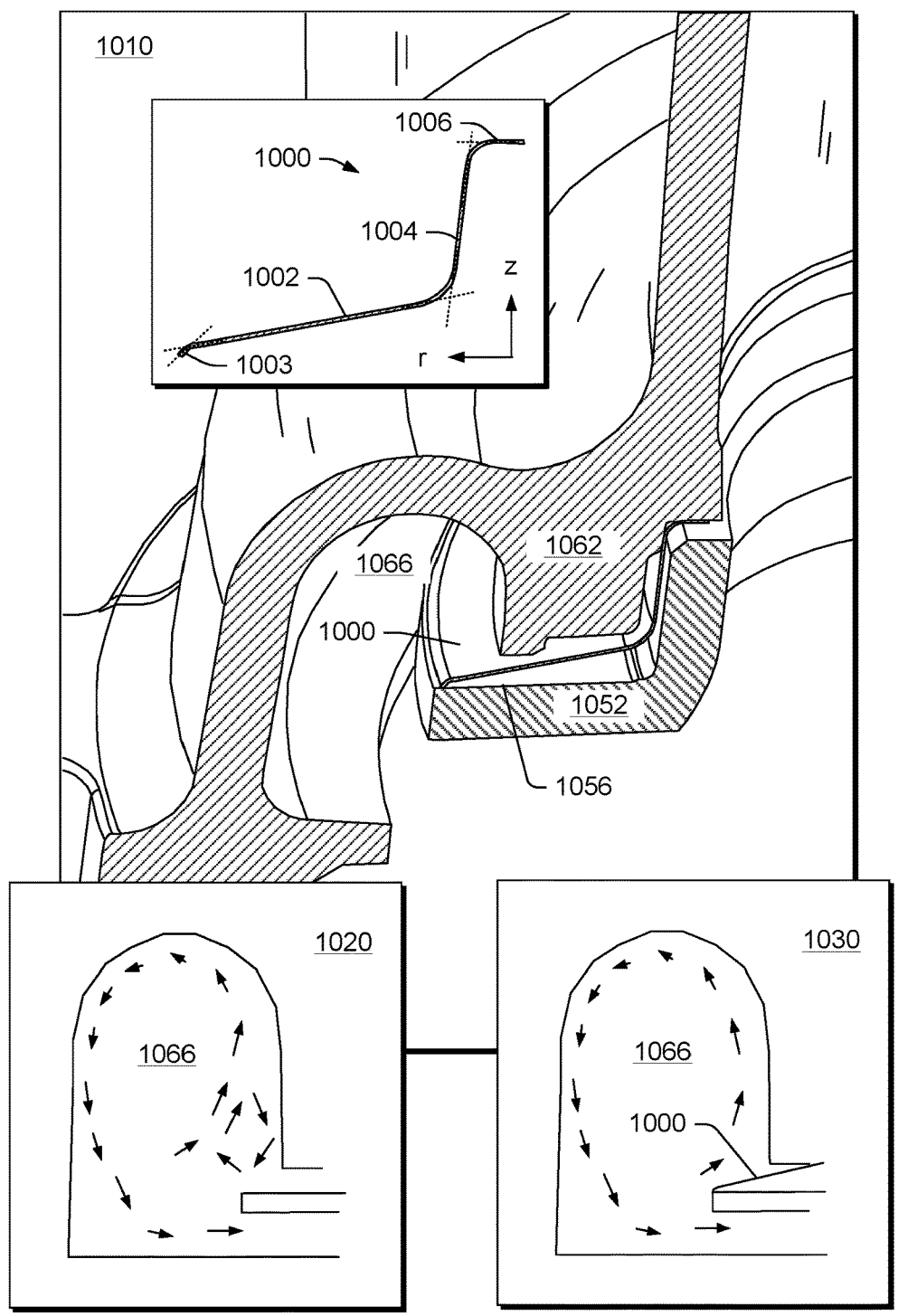
FIG. 10 is a series of cross-sectional views that include an assembly that includes an example of a seal.

FIG. 10 shows an example of a seal 1000 in an assembly 1010 that includes a component 1052 and a turbine housing 1062 where the component 1052 and the turbine housing 1062 form, in part, a volute 1066. In the example of FIG. 10, the seal 1000 includes a lower lip 1002, a lower end 1003 (e.g., disposed at an angle to the lower lip 1002), a wall 1004 (e.g., approximately vertical in an axial direction) and an upper lip 1006 where the lower lip 1002 extends into the volute 1066 in a sloping manner (e.g., terminating at the end 1003) that acts to transform the volute 1066 from having a sharp shoulder to having a sloped shoulder. As shown in simplified cross-sectional views of an assembly 1020 with a sharp shoulder and an assembly 1030 with a sloped shoulder, the sloped shoulder formed by the seal 1000 may act to smooth exhaust flow in the volute 1066. For example, where rotational flow exists in the volute 1066, an eddy or eddies may form in response to the sharp shoulder whereas flow response to the sloped shoulder may avoid formation of such an eddy or eddies (e.g., or lessen eddy size, dynamics, etc.).

As an example, a seal may extend into a volute where exhaust flowing in the volute is impacted by the seal. As an example, such a seal may act to smooth exhaust flow in a volute and optionally lessen losses (e.g., due to eddy formation, etc.).

In the example of FIG. 10, the component 1052 may include apertures that receive bolts, spacers, studs, etc. In such an example, the seal 1000 may extend over such components and act to smooth flow (e.g., in the volute 1066). As an example, length of a leg of a seal 1000 may be selected to provide a desired stiffness. For example, where contact occurs at a greater radial distance between a seal and a component (e.g., the component 1052), stiffness may differ compared to a seal where contact occurs at a lesser radial distance between the seal and the component (e.g., given a similar seal profile, thickness, material of construction, etc.).

Figure 11:
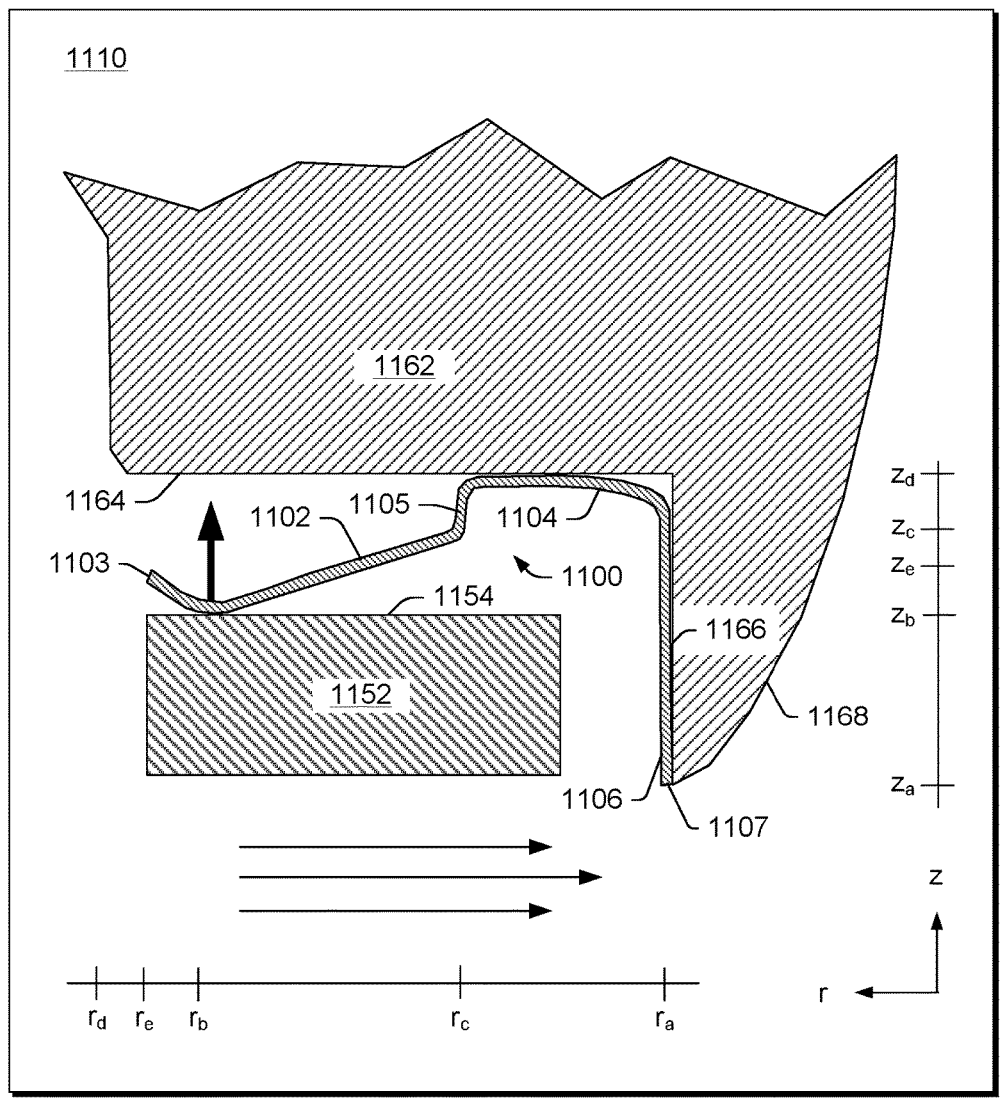
FIG. 11 is a cross-sectional view of an example of an assembly that includes an example of a seal.

FIG. 11 shows an example of a seal 1100 in an assembly 1110 that includes a component 1152 and a turbine housing 1162. In the example of FIG. 11, the seal 1100 includes a sloping lip 1102 that extends to an end 1103, an annular wall 1104 (e.g., connected to the lip 1102 by a short cylindrical wall 1105) and a cylindrical wall 1106 that extends axially downwardly from the annular wall 1106 to an end 1107 and the turbine housing 1162 includes a shoulder between an annular, axial face 1164 and a cylindrical, radial face 1166 as well as a contoured surface 1168 (e.g., a shroud surface) while the component 1152 includes an annular, axial face 1154. Upon assembly, the seal 1100 is compressed (e.g., loaded) between the component 1152 and the turbine housing 1162, particularly at a transition point between the lower lip 1102 and the end 1103. During assembly, the seal 1100 may be press fit (e.g., interference fit) to the turbine housing 1162, for example, where the cylindrical wall 1106 of the seal 1100 contacts the cylindrical, radial face 1166 of the turbine housing 1162.

As an example, the seal 1100 may be press fit onto the turbine housing 1162 and axially positioned such that at least a portion of the annular wall 1104 of the seal 1100 contacts the annular, axial face 1154 of the turbine housing 1162. In such an example, as the component 1152 is brought into contact with the seal 1100, the seal 1100 may be loaded and compressed, for example, which may help "balance" the component 1152 (e.g., axially locating or limiting movement of the component 1152), which may optionally be a component of a variable geometry cartridge (e.g., a plate, etc.) that may include one or more vanes, etc., that define exhaust flow throats for flow of exhaust to a turbine wheel space (see, e.g., flow arrows). As shown, the seal 1100 can act to seal a space between the component 1152 and the turbine housing 1162 (e.g., to prevent exhaust leakage therethrough). In the example of FIG. 11, the seal 1100 may contact the component 1152 along the surface 1154 and contact the turbine housing 1162 along the surface 1164 and the surface 1166 such that the three contacts assist with, for example, one or more of sealing, loading and positioning (e.g., locating).

FIG. 11 also shows some examples of radial and axial positions, for example, axial positions labeled $z_a$ to $z_e$ and radial positions labeled $r_a$ to $r_e$. For example, the end 1107 of the seal 1100 may be located at $r_a$, $z_a$ while the end 1103 of the seal 1100 may be located at $r_e$, $z_e$. As to the cylindrical wall 1105, it may extend an axial length between about $z_c$ and $z_d$, for example, at a radial location $r_b$. As an example, the axial length may be selected to adjust a stiffness of the lower lip 1102 (e.g., slope of the lower lip 1102, etc.). In the example of FIG. 11, the seal 1110 contacts the component 1152 at approximately $r_b$, $z_b$ (see, e.g., force arrow indicating direction of force applied by the component 1152 to the seal 1100). IN such an example, contact may occur over a relatively small annular surface area (e.g., an annular line) that acts to concentrate force (e.g., increase pressure) and form a tight seal (e.g., optionally achieved in part via an axially upward bend to the end 1103 of the seal 1100 to form a transition point at approximately $r_b$, $z_b$). As mentioned, the seal 1100 may also provide for loading (e.g., to assist in axially locating one component with respect to another component). As an example, depending on configuration of components, the seal 1100 may positioned in an assembly where it is exposed to exhaust via a volute substantially on one side and via another passage substantially on another side.

As an example, a turbine assembly can include a turbine wheel that includes a base, a nose, blades, and a rotational axis that extends from the base to the nose; a shroud component that includes an axis aligned with the rotational axis of the turbine wheel, an inner shroud surface, a lower axial face, an upper axial face and an outer surface that extends between the lower axial face and the upper axial face; a turbine housing that includes an axis aligned with the rotational axis of the turbine wheel, a lower axial face, an upper axial face and an inner surface that extends between the lower axial face and the upper axial face; and a seal that includes an axis aligned with the rotational axis of the turbine wheel, a wall disposed between the outer surface of the shroud component and the inner surface of the turbine housing, and a lower lip extending radially outwardly from the wall at an obtuse angle, the lower lip disposed, at least in part, between the lower axial face of the shroud component and the lower axial face of the turbine housing. In such an example, the seal can include an upper lip that extends from the wall where the upper lip is disposed between the upper axial face of the shroud component and the upper axial face of the turbine housing. As an example, the upper lip of the seal may extend radially inwardly from the wall at approximately a right angle.

As an example, a seal may include an upper, inwardly hooked portion that extends from a wall of the seal or an upper, outwardly hooked portion that extends from a wall of the seal.

As an example, a wall of a seal may include a bend that defines an upper wall portion axially above the bend and a lower wall portion axially below the bend. In such an example, the upper wall portion can include a diameter that is less than a diameter of the lower wall portion.

As an example, a lower lip of a seal may include a transition point defined as a transition between two oppositely sloped portions of the lower lip.

As an example, a wall of a seal may contact an inner surface of a turbine housing. In such an example, the contact may be via an interference fit between the seal and the turbine housing (e.g., where contact occurs over at least a portion of the wall). As an example, a lower lip of a seal may contact a lower axial face of the shroud component. Such contact may occur at a transition point where the lower lip extends radially outwardly from a wall of the seal at an obtuse angle and then transitions to another angle from the transition point to an edge of the lower lip.

As an example, a wall of a seal may include a diameter that exceeds a diameter of an inner surface of a turbine housing to provide for an interference fit between the seal and the turbine housing.

As an example, for a relaxed state of a seal, a lower lip of the seal may extend outwardly from a wall of the seal at an obtuse angle and, for a compression state of the seal, the lower lip may extend outwardly at a lesser, obtuse angle to the wall.

As an example, a seal may contact a shroud component and contacts a turbine housing, for example, where the seal is loaded via such contacts with the shroud component and the turbine housing and where the lower axial face of the turbine housing and the lower axial face of the shroud component load the seal.

As an example, a turbine housing may define, at least in part, a volute and a lower axial face of a shroud component may extend radially outwardly into the volute and where a lower lip of a seal contacts the lower axial face of the shroud component and extends radially outwardly into the volute. In such an example, the lower lip of the seal may extend at an angle into the volute to shape, in part, the volute.

As an example, a method can include providing a center housing, a variable geometry cartridge, a turbine housing and a seal that includes a wall and a lower lip extending radially outwardly from the wall at an obtuse angle; positioning the variable geometry cartridge with respect to the center housing; and attaching the turbine housing to the center housing with the seal disposed between the variable geometry cartridge and the turbine housing to form a turbocharger and to thereby apply an axial load to the variable geometry cartridge via at least the lower lip of the seal. As an example, such a method can include operating the turbocharger and expanding or contracting the seal between the variable geometry cartridge and the turbine housing. As an example, a method may include maintaining an axial load on a variable geometry cartridge via a seal to axially locate the variable geometry cartridge.

As an example, a turbocharger assembly can include a compressor wheel disposed in a compressor housing; a center housing that includes a bore and a bearing system disposed in the bore, the compressor housing attached to the center housing; a shaft and turbine wheel assembly that includes a shaft portion, a turbine wheel portion, and a rotational axis where the compressor wheel is attached to the shaft portion and the shaft portion is rotatably supported by the bearing system disposed in the bore of the center housing; a variable geometry cartridge positioned with respect to the center housing where the variable geometry cartridge includes a shroud component having an axis aligned with the rotational axis of the turbine wheel, an inner shroud surface, a lower axial face, an upper axial face and an outer surface that extends between the lower axial face and the upper axial face; a turbine housing attached to the center housing where the turbine housing includes an axis aligned with the rotational axis of the turbine wheel, a lower axial face, an upper axial face and an inner surface that extends between the lower axial face and the upper axial face; and a seal that includes an axis aligned with the rotational axis of the turbine wheel, a wall disposed between the outer surface of the shroud component and the inner surface of the turbine housing, and a lower lip extending radially outwardly from the wall at an obtuse angle, the lower lip disposed, at least in part, between the lower axial face of the shroud component and the lower axial face of the turbine housing.

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions.

What is claimed is:

1. A turbine assembly comprising:
   a turbine wheel that comprises a base, a nose, blades, and a rotational axis that extends from the base to the nose;
   a shroud component that comprises an axis aligned with the rotational axis of the turbine wheel, an inner shroud surface, a lower axial face, an upper axial face and an outer surface that extends between the lower axial face and the upper axial face;
   a turbine housing that comprises an axis aligned with the rotational axis of the turbine wheel, a lower axial face, an upper axial face and an inner surface that extends between the lower axial face and the upper axial face; and
   a seal that comprises
      an axis aligned with the rotational axis of the turbine wheel,
      a wall disposed between the outer surface of the shroud component and the inner surface of the turbine housing, and
      a lower lip extending radially outwardly from the wall, the lower lip disposed, at least in part, between the lower axial face of the shroud component and the lower axial face of the turbine housing and in contact with the lower axial face of the turbine housing.

2. The turbine assembly of claim 1 wherein the seal comprises an upper lip that extends from the wall wherein the upper lip is disposed between the upper axial face of the shroud component and the upper axial face of the turbine housing.

3. The turbine assembly of claim 2 wherein the upper lip of the seal extends radially inwardly from the wall at approximately a right angle.

4. The turbine assembly of claim 1 wherein the seal comprises an upper, inwardly hooked portion that extends from the wall.

5. The turbine assembly of claim 1 wherein the wall of the seal contacts the inner surface of the turbine housing.

6. The turbine assembly of claim 1 wherein the wall of the seal comprises a diameter that exceeds a diameter of the inner surface of the turbine housing to provides for an interference fit between the seal and the turbine housing.

7. The turbine assembly of claim 1 wherein the seal contacts the shroud component and contacts the turbine housing.

8. The turbine assembly of claim 1 wherein the turbine housing defines, at least in part, a volute and wherein the lower axial face of the shroud component extends radially outwardly into the volute.

9. The turbine assembly of claim 1 wherein the outer surface of the shroud component comprises a ridge.

10. The turbine assembly of claim 9 wherein the seal contacts the ridge.

11. A method comprising:
    providing a center housing, a variable geometry cartridge, a turbine housing and a seal that comprises a wall and a lower lip;
    positioning the variable geometry cartridge with respect to the center housing; and
    attaching the turbine housing to the center housing with the seal disposed between the variable geometry cartridge and the turbine housing to form a turbocharger wherein the lower lip of the seal contacts a surface of the turbine housing.

12. The method of claim 11 further comprising operating the turbocharger and expanding or contracting the seal between the variable geometry cartridge and the turbine housing.

13. A turbocharger assembly comprising:
   a compressor wheel disposed in a compressor housing;
   a center housing that comprises a bore and a bearing system disposed in the bore, the compressor housing attached to the center housing;
   a shaft and turbine wheel assembly that comprises a shaft portion, a turbine wheel portion, and a rotational axis wherein the compressor wheel is attached to the shaft portion and the shaft portion is rotatably supported by the bearing system disposed in the bore of the center housing;
   a variable geometry cartridge positioned with respect to the center housing wherein the variable geometry cartridge comprises a shroud component that comprises an axis aligned with the rotational axis of the turbine wheel, an inner shroud surface, a lower axial face, an upper axial face and an outer surface that extends between the lower axial face and the upper axial face;
   a turbine housing attached to the center housing wherein the turbine housing comprises an axis aligned with the rotational axis of the turbine wheel, a lower axial face, an upper axial face and an inner surface that extends between the lower axial face and the upper axial face; and
   a seal that comprises
      an axis aligned with the rotational axis of the turbine wheel,
      a wall disposed between the outer surface of the shroud component and the inner surface of the turbine housing, and
      a lower lip extending radially outwardly from the wall, the lower lip disposed, at least in part, between the lower axial face of the shroud component and the lower axial face of the turbine housing and in contact with the lower axial face of the turbine housing.

* * * * *